United States Patent
Datta et al.

(10) Patent No.: US 9,251,425 B2
(45) Date of Patent: Feb. 2, 2016

(54) OBJECT RETRIEVAL IN VIDEO DATA USING COMPLEMENTARY DETECTORS

(71) Applicant: International Business Machines Corporation, Armonk, NY (US)

(72) Inventors: Ankur Datta, White Plains, NY (US); Rogerio S. Feris, Hartford, CT (US); Sharathchandra U. Pankanti, Darien, CT (US); Yun Zhai, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/620,510

(22) Filed: Feb. 12, 2015

(65) Prior Publication Data

US 2015/0154457 A1 Jun. 4, 2015

Related U.S. Application Data

(63) Continuation of application No. 13/535,409, filed on Jun. 28, 2012, now Pat. No. 9,002,060.

(51) Int. Cl.
*G06K 9/00* (2006.01)
*G06K 9/62* (2006.01)

(52) U.S. Cl.
CPC ........ *G06K 9/00771* (2013.01); *G06K 9/00718* (2013.01); *G06K 9/00758* (2013.01); *G06K 9/6215* (2013.01); *G06K 9/6218* (2013.01); *G06K 9/6256* (2013.01); *G06K 9/6262* (2013.01); *G06K 2009/00738* (2013.01)

(58) Field of Classification Search
CPC ............ G06K 9/00771; G06K 9/6262; G06K 9/6218; G06K 9/6215; G06K 9/00718; G06K 9/00758; G06K 2009/00738; G06K 9/6256

See application file for complete search history.

(56) References Cited

U.S. PATENT DOCUMENTS

| | | | |
|---|---|---|---|
| 7,899,211 B2 * | 3/2011 | Fujimoto | G06T 7/0083 340/436 |
| 7,920,626 B2 | 4/2011 | Fernandez et al. | |

(Continued)

OTHER PUBLICATIONS

Foresti, A Real-time System for Video Surveillance of Unattended Outdoor Environments, IEEE, 1998, pp. 697-704.

(Continued)

*Primary Examiner* — Brian Le
(74) *Attorney, Agent, or Firm* — Patrick J. Daugherty; Driggs, Hogg, Daugherty & Del Zoppo Co., LPA

(57) ABSTRACT

Automatic object retrieval from input video is based on learned, complementary detectors created for each of a plurality of different motionlet clusters. The motionlet clusters are partitioned from a dataset of training vehicle images as a function of determining that vehicles within each of the scenes of the images in each cluster share similar two-dimensional motion direction attributes within their scenes. To train the complementary detectors, a first detector is trained on motion blobs of vehicle objects detected and collected within each of the training dataset vehicle images within the motionlet cluster via a background modeling process; a second detector is trained on each of the training dataset vehicle images within the motionlet cluster that have motion blobs of the vehicle objects but are misclassified by the first detector; and the training repeats until all of the training dataset vehicle images have been eliminated as false positives or correctly classified.

20 Claims, 4 Drawing Sheets

(56) References Cited

U.S. PATENT DOCUMENTS

| | | | |
|---|---|---|---|
| 2008/0259179 A1 | 10/2008 | Senior et al. | |
| 2010/0027875 A1 | 2/2010 | Hampapur et al. | |
| 2011/0044499 A1 | 2/2011 | Cobb et al. | |
| 2012/0263346 A1* | 10/2012 | Datta | G06K 9/4604 382/103 |

OTHER PUBLICATIONS

IBM, Ageing of Sketch Data Structure for Summarizing Large Data Sets, IP.com, Inc., Mar. 5, 2007, pp. 1-9.

Anonymous, Large and high resolution display of images on a large screen using multiple DVI connections, IP.com, Sep. 29, 2010, 2 pp.

Anonymous, Advanced Video Management Systems, IP.com, Inc., Dec. 22, 2009, 21 pp.

Viola et al, Robust Real-time Object Detection, Second International Workshop on Statistical and Computational Theories of Vision—Modeling, Learning, Computing, and Sampling, Jul. 13, 2001, pp. 1-25.

U.S. Appl. No. 13/535,407, filed Jun. 28, 2012; Confirmation No. 4257; GAU 2666.

Notice of Allowance (Mail Date Nov. 24, 2014) for U.S. Appl. No. 13/535,407, filed Jun. 28, 2012; Confirmation No. 4257; GAU 2666.

* cited by examiner

OBJECT RETRIEVAL IN VIDEO DATA USING COMPLEMENTARY DETECTORS

FIELD OF THE INVENTION

Embodiments of the present invention relate to applying computer vision techniques to automatically detect specific events based on learned detectors in video stream data.

BACKGROUND

The number of surveillance cameras monitoring public places is growing worldwide. For example, the United Kingdom has installed more than four million security cameras over the past decade ending in 2012. In New York City, U.S.A., the number of operating cameras has grown rapidly. Such systems may provide more comprehensive coverage of public areas relative to relying on the limited comprehension of on-scene human monitors, enabling public safety personnel monitoring the cameras to more quickly spot (in real time) and abate threats to public safety. Video surveillance may enable personnel to monitor from one location a wide variety of other locations remote from the observer's location, for example to monitor a plurality of bridges for deteriorating structures, streets for speeding automobiles, structures for fires, public assembly areas for abandoned packages that fit explosive device activity profiles, etc. Thus, one person can monitor a limitless number of different areas without the temporal limitations of the need to be physically present in each area, greatly expanding the capabilities of the monitor.

However, the capabilities of such systems may be limited by reliance on human perception to review the video feeds and make the necessary determinations to spot and abate problems. The number of personnel available to watch video footage from vast camera arrays is generally limited by budgetary and other resource limitations, as is the ability of any one human monitor to perceive a threat in a given video feed. The process of watching surveillance videos is resource consuming, suffers from high costs of employing security personnel, and efficiency in such systems to detect events of interest is also limited by the constraints of human comprehension.

The field of intelligent visual surveillance seeks to address this problem by applying computer vision techniques to automatically detect specific events in video streams. Such systems may enable automatic object discernment and retrieval based on visual attributes from surveillance videos, generally by focusing on a limited universe of objects of interest, such as stationary packages as distinguished from non-static objects, vehicles as distinguished from pedestrians and stationary structures, etc. However, the efficacy of such systems in real-world conditions may be limited, and high rates of false positive detections or low rates of accuracy in detecting true events may limit the usefulness and trustworthiness of such systems.

BRIEF SUMMARY

In one embodiment of the present invention, a method for automatic object retrieval from input video is based on learned, complementary detectors created for each of a plurality of different motionlet clusters. The motionlet clusters are partitioned from a dataset of training vehicle images as a function of determining that vehicles within each of the scenes of the images in each cluster share similar two-dimensional motion direction attributes within their scenes. To train the complementary detectors, a first detector is trained on motion blobs of vehicle objects detected and collected within each of the training dataset vehicle images within the motionlet cluster via a background modeling process; a second detector is trained on each of the training dataset vehicle images within the motionlet clusters that have motion blobs of the vehicle objects but are misclassified by the first detector; and the training of the first and second detectors repeats until all of the training dataset vehicle images within the motionlet cluster have been eliminated as false positives or correctly classified by the detectors.

In another embodiment, a system has a processing unit, computer readable memory and a tangible computer-readable storage medium with program instructions, wherein the processing unit, when executing the stored program instructions, performs automatic object retrieval from input video based on learned, complementary detectors created for each of a plurality of different motionlet clusters. The motionlet clusters are partitioned from a dataset of training vehicle images as a function of determining that vehicles within each of the scenes of the images in each cluster share similar two-dimensional motion direction attributes within their scenes. To train the complementary detectors, a first detector is trained on motion blobs of vehicle objects detected and collected within each of the training dataset vehicle images within the motionlet cluster via a background modeling process; a second detector is trained on each of the training dataset vehicle images within the motionlet cluster that have motion blobs of the vehicle objects but are misclassified by the first detector; and the training of the first and second detectors repeats until all of the training dataset vehicle images within the motionlet cluster have been eliminated as false positives or correctly classified by the detectors.

In another embodiment, an article of manufacture has a tangible computer-readable storage medium with computer readable program code embodied therewith, the computer readable program code comprising instructions that, when executed by a computer processing unit, cause the computer processing unit to perform automatic object retrieval from input video based on learned, complementary detectors created for each of a plurality of different motionlet clusters. The motionlet clusters are partitioned from a dataset of training vehicle images as a function of determining that vehicles within each of scenes of the images in each cluster share similar two-dimensional motion direction attributes within their scenes. To train the complementary detectors, a first detector is trained on motion blobs of vehicle objects detected and collected within each of the training dataset vehicle images within the motionlet cluster via a background modeling process; a second detector is trained on each of the training dataset vehicle images within the motionlet cluster that have motion blobs of the vehicle objects but are misclassified by the first detector; and the training of the first and second detectors repeats until all of the training dataset vehicle images within the motionlet cluster have been eliminated as false positives or correctly classified by the detectors.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
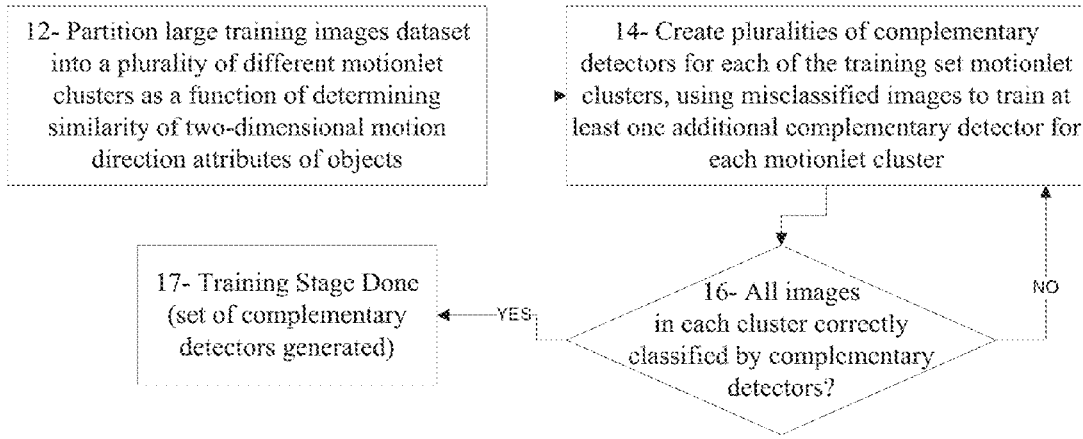
FIG. 1 is a block diagram illustration of an embodiment of a training (off-line) stage of a method, process or system for automatic object retrieval from surveillance videos based on learned detectors according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Intelligent visual surveillance comprehends applying computer vision techniques to automatically detect specific events in video stream data. Embodiments of the present invention address problems in learning robust and efficient multiview object detectors for surveillance video indexing and retrieval. Prior art surveillance systems generally use background modeling for detecting moving objects in a given scene, such as a pubic assembly area, roadway, pathway, etc. However, these approaches have limitations in effectively handling variable image quality obtained from real-world scenes. For example, due to varying lighting conditions caused by changing environmental conditions such as rain, reflections, shadows; also, crowded scenes and other unpredictable object behavior, multiple, distinct objects close to each other may become merged into a single blob.

Appearance-based object detectors may be implemented within the prior art as alternative or complementary solutions to deal with the background modeling limitations noted above. However, such approaches are generally limited in terms of accuracy and computational speed. Modeling appearance is a difficult problem, in one aspect due to dramatic non-linear variations in the object appearance manifold incurred by pose and lighting changes. Although significant progress has been made over the past decades, most techniques are not designed to handle large amounts of data, and systems implementing prior art approaches are usually limited to run below 15 frames-per-second. However, higher frame rates are required to effectively manage large-scale surveillance systems that run many video channels per server.

More particularly, online learning methods may be suitable for processing large amounts of streaming data, and may be used for online classifier adaptation as new data comes in. However, a common limitation of prior art techniques is inaccuracy in capturing online data to correctly update their classifiers. Some detector algorithms based on Support Vector Machines (SVM) or Adaboost classifiers consider a few thousands of training examples for learning a classifier, but as the number of training images grow to millions, training a single classifier may become infeasible due to computational requirements and convergence issues. Convolutional neural networks offers more advantages to handle large datasets, but are difficult to tune and, depending on the complexity of the data, may require a large number of filters.

Embodiments of the present invention instead break up the complexity of the training data by learning efficient detectors on small strategically selected data partitions. FIG. 1 illustrates a training (off-line) stage in one embodiment of the present invention for automatic object retrieval from surveillance videos based on learned detectors. The present embodiment focuses on vehicle objects, though other embodiments may focus on other objects. At 12 a large training dataset comprising a plurality of vehicle images is automatically partitioned (via computer vision processes performed by a processing unit of a programmable device) into a plurality of different "motionlet" clusters as a function of determining that the vehicles within the images in each cluster share similar two-dimensional (2D) motion direction attributes within their scene. In effect, the process determines the orientation of the vehicles within the scenes to determine a direction of travel within the scene, and distinguishes the determined direction from the motion direction attributes of each of the other clusters. This splits the large, universal training dataset input into a plurality of discrete semantic cluster partitions related to vehicle poses determined within the image data.

At 14 plurality compact, complementary detectors are created for each of the training set motionlet clusters. Each motionlet cluster may contain a fairly large number of images (for example, tens of thousands). This data is further split by the processing unit at 14 by training a set of complementary detectors for each motionlet cluster according to the following algorithm:

```
For each motionlet cluster (M_i) do:
    ImSet ← Set of Images from M_i;
    While ImSet is not empty do:
        X ← Random Subset from ImSet;
        Train a Deep Cascade Detector D_i on X;
        DetPool ← DetPool U{D_i};
        ImSet ← Subset of Images in ImSet misclassified by DetPool;
    EndWhile;
EndFor.
```

More particularly, training the deep cascade detectors $\{D_i\}$ at 14 uses misclassified images to train at least one more complementary detector for each motionlet cluster. In one example, the deep cascade detectors are trained by methods and processes taught by P. Viola and M. Jones in "Robust Real-time Object Detection," (published in the International Journal of Computer Vision, 2004), wherein a cascade of Adaboost classifiers is used to tune weak learners (simple thresholds over Haar-like features), with each stage of the cascade tuned to minimize false negatives at the expense of a larger number of false positives, and wherein a collection of weak classification functions is combined to form a stronger classifier having a lowest classification error. However, it will be appreciated by one skilled in the art that other learning methods may be used in embodiments of the present invention.

Embodiments of the present invention thereby eliminate many redundant samples that are explained by previous detectors. The creation of the compact, complementary detectors at 14 trains or tunes the detectors to have very few or no false alarms with respect to sets of positive images within their respective motionlet cluster training image sets. As indicated at 16, the processes continues at 14 until all the images in each of the subset clusters have been correctly classified by complementary detectors and the training stage is complete at 17, resulting in the generation of a set of complementary detectors.

Figure 2:
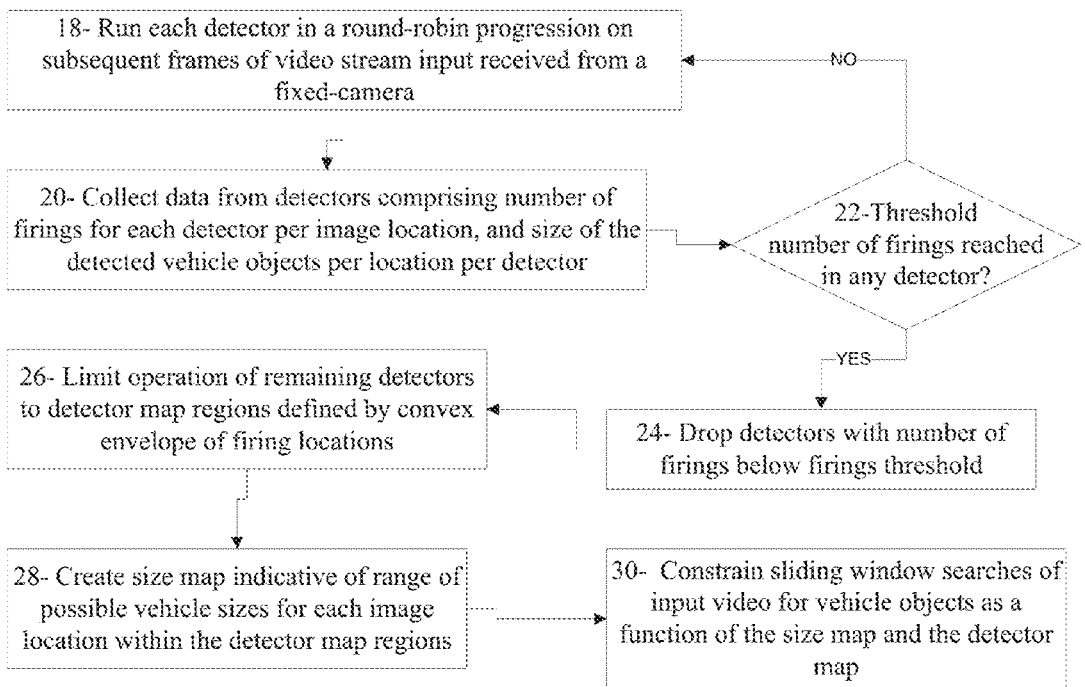
FIG. 2 is a block diagram illustration of an embodiment of a testing (on-line) stage of a method, process or system for automatic object retrieval from surveillance videos based on learned detectors according to the present invention.

FIG. 2 illustrates a testing (on-line) stage of the present embodiment for automatic object retrieval from surveillance videos based on learned detectors. At 18, in response to a video stream input received from a fixed-camera surveillance video for analysis, the process selects a subset of the created pool of complementary detectors trained at 14 (FIG. 1) that are suitable for the image information from the fixed-camera video during an auto-calibration mode of the system. More particularly, the process initially interleaves all the detectors across a temporal domain by running a first detector in a first frame input, then a second, different detector in data from a subsequent, second frame, and so on, in a round-robin progression or fashion. The detectors are generally applied at 18 using multi-scale sliding windows over foreground regions obtained by background modeling. Data is collected with respect to each of the applied detectors at 20, the data comprising number of firings for each detector per image location, size of the detected vehicle objects per location per detector, etc.).

The detector application at 18 and data collection at 20 continues until a threshold number of firings is reached at 22, and wherein at 24 all detectors that do not have a sufficient number of firings according to the threshold are immediately dropped (or killed) from application to input image data. For those detectors that remain alive, the process limits their operation on the input video at 26 to specific regions defined by a convex envelope of their firing locations within a detector map 40 illustrated in FIG. 3B.

Figures 3A, 3B:
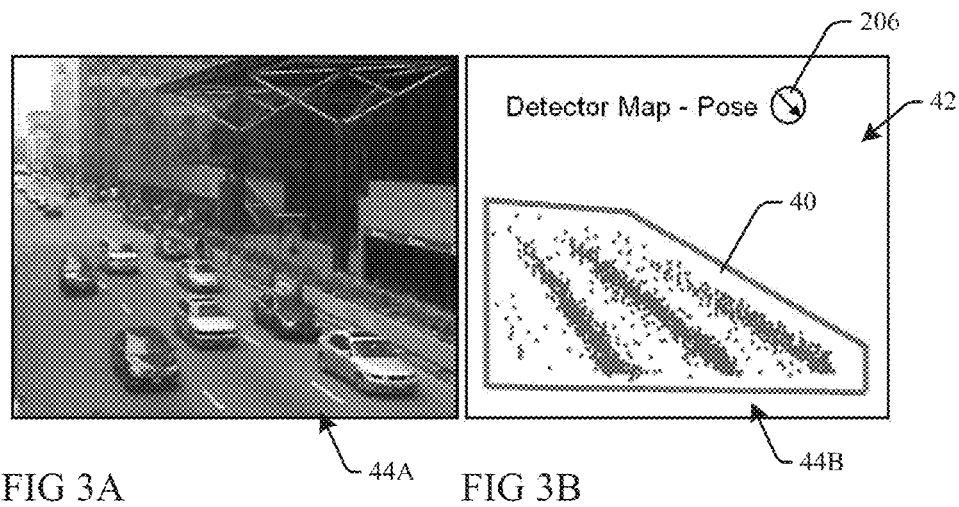
FIG. 3A is a photographic illustration of a roadway scene appropriate for use with embodiments of the present invention.
FIG. 3B is a graphic illustration of a detector map representation of the roadway scene of FIG. 3A according to embodiments of the present invention.

More particularly, in certain traffic scenes, such as the roadway scene 44A depicted in FIG. 3A, vehicles may drive in a single direction and with a well-defined pose. Even in more complex traffic intersections, vehicles may appear in only a few specific poses most of the time, and are generally allowed to turn only at specific image locations. Accordingly analysis of the image data of the scene 44A in FIG. 3A provides the detector map 40 within the representation 44B depicted in FIG. 3B of the original scene 44A. Analysis of the image data within the scene 44A shows vehicle presence only within detector map 40, and not in those remainder portions 42 of the scene 44B. Analysis of the vehicle image data may also indicate that the vehicles therein are generally aligned within a pose orientation 206, which may be used to select a corresponding subset of the motionlet cluster detectors.

The minimum and maximum expected vehicle sizes can also be predicted at each image location within the detector map 40. Accordingly, at 28 the process further creates a size map which indicates a range of possible vehicle sizes for each image location within the detector map regions. In one embodiment, this is done by fitting a plane using least squares with the size data collected when the system is operating in the auto-calibration mode.

At 30 the input video from the fixed camera is analyzed for vehicle objects by constraining sliding window searches for the vehicles as a function of the size map created at 28, and the detector map created at 26. The size map constrains the sliding window searches at 30 over multiple scales, leading to more efficiency and more accuracy in the analysis of the video data from the fixed camera view. By exploiting scene geometry constraints, the embodiment uses subsets of the large pool of complementary detectors to effectively capture vehicles in surveillance videos. As only the remaining detectors selected at 26 of the universe of trained detectors are applied to the video input at 32, running only at the specific size map regions of the image frames determined at 28 and as constrained at 30, the present embodiment is more efficient relative to other prior art systems that select and apply larger numbers of detectors to larger image areas of input video data.

Figure 4:
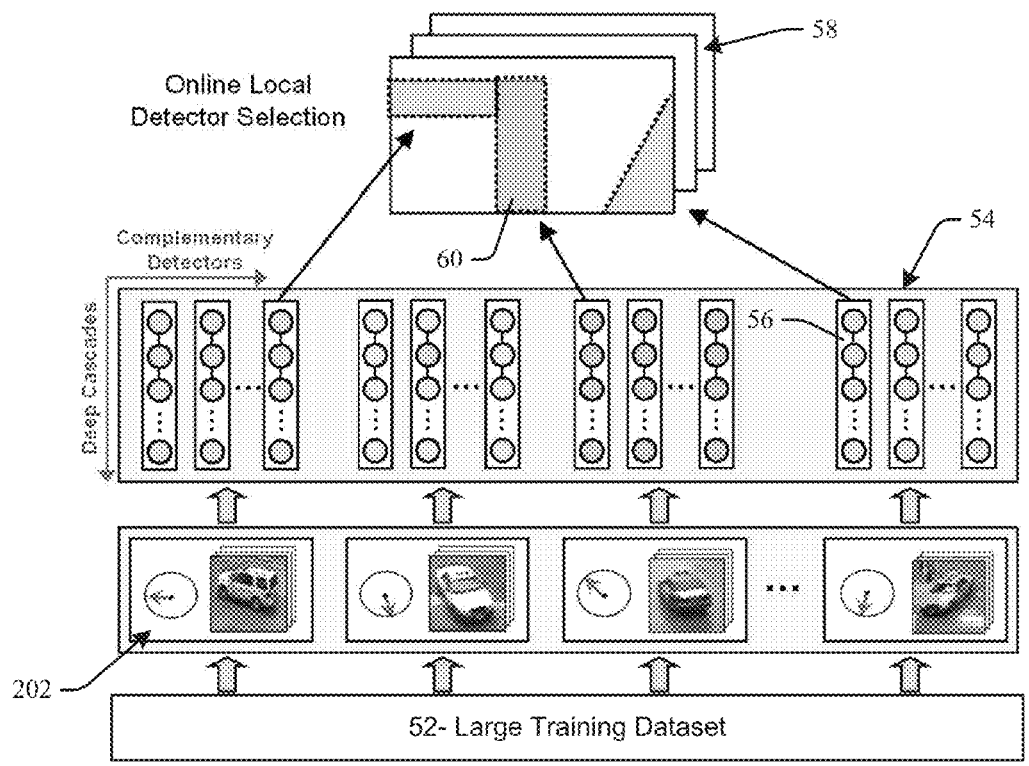
FIG. 4 is a block diagram illustration of system architecture according to an embodiment of the present invention.

FIG. 4 illustrates one embodiment of system architecture according to the process and systems of FIGS. 1 and 2. In the present example, a large training dataset 52 of about one million images is automatically partitioned into a plurality of different motionlet clusters 202, a function of determining that the objects of interest (in this example, vehicles) within the images in each motionlet cluster 202 share similar motion direction attributes, thereby splitting the training dataset 52 into semantic partitions related to vehicle poses. For each of the motionlet cluster partitions 202, the compact, complementary detectors 56 are created, each trained in a deep cascade structure using large pluralities (for example, hundreds of thousands) of selected negative examples. This results in the formation of a large pool 54 of the compact detectors that are selected or tuned to work on the specific regions or sub-manifolds 60 of object appearance found in individual scene images 58 of the input fixed-camera data stream, the specific regions 60 defined by the convex envelope of their firing locations within the detector map at 26 of FIG. 2.

The present embodiments use a huge vehicle dataset 52 containing around one million images for learning object representations. The images contain significant variation in vehicle pose and different lighting conditions, and the appearance manifold of vehicle images under varying pose and lighting is complex and highly non-linear. Learning a monolithic detector on such a complex manifold must overcome convergence problems and computational speed issues, not only for learning, but also for testing, as a monolithic detector trained on a large and diverse dataset is not compact and requires a large number of feature computations. Instead, the present embodiment adopts a different object representation in training a large pool of complementary, compact, deep cascade detectors.

Partitioning the Motionlet Clusters.

Figure 5:
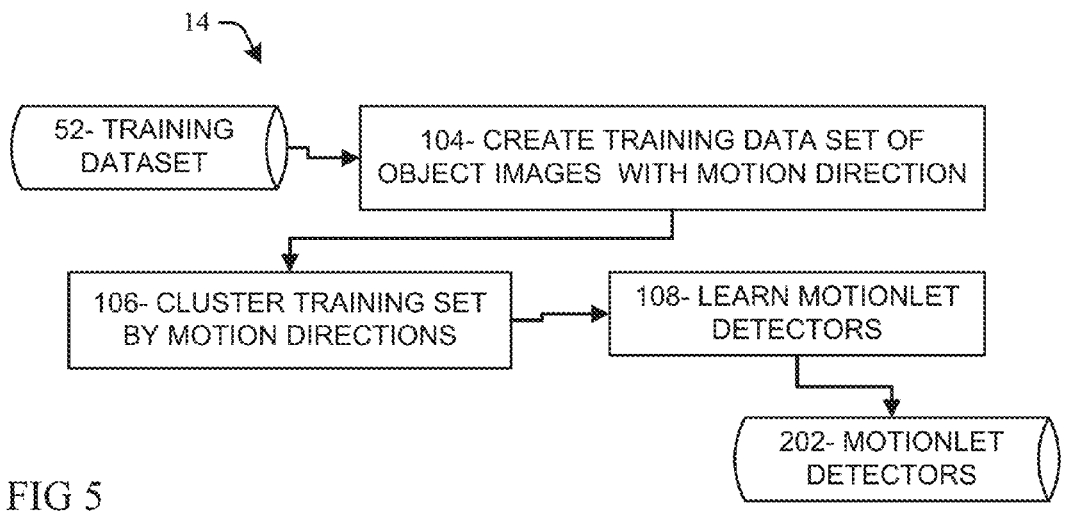
FIG. 5 is a block diagram illustration of an embodiment of a system or process for portioning dataset into clusters and creating associated detectors according to the method, process or system or FIG. 1.

FIG. 5 illustrates one example of learning the detectors 56 at 14 of FIG. 1 by automatically partitioning the input dataset 52 into the motionlet clusters 202 of vehicle images that share similar 2D motion direction. At 104 a training data set of object motion blobs is created, representing objects detected and collected from the training dataset 52 via a background modeling process (for example, using Gaussian mixture processes, though other systems and methods will be apparent to one skilled in the art). As will be appreciated by one skilled in the art, object motion blobs are generally black/white images where white areas correspond to motion and black areas to non-motion regions, and wherein the underlying image regions are used as the training data set. Accordingly, creating the training video data set at 104 comprises selecting a set of blob images that each contain objects of different types under multiple lighting conditions and comprising many different poses captured from one or more video cameras, wherein blobs found in a user-defined region of interest (ROI) and having an acceptable size, aspect ratio, and an ascertainable direction of motion are automatically added to the training set at 104.

Each training image in the dataset created at 104 contains an associated motion direction of the object obtained through an optical flow process. At 106 the training set of object images is automatically split into the plurality of motionlets 202, subsets of the object images clustered as a function of similarity of their associated motion directions which are used to learn the complementary detectors for each of the motionlets at 108. The dataset partitioning at 106 is based on motion direction and is fully automatic, with no need for a user to manually label object poses. In one example, the training data set 52 is split into twelve (12) different motionlet detector sets 202, which each comprise sets of images 204 that are clustered according to different associated motion direction attributes 206 extracted or otherwise determined for the vehicle images in the motionlet images. However, it is to be understood that more or less motionlet detector sets 202 may be practiced in other embodiments.

Complementary Detectors.

The motion information of a vehicle is directly related to its pose; therefore, this operation provides a semantic partitioning of the dataset. However, each motionlet cluster may still contain a fairly large number of images (for example, tens of thousands). Accordingly, the present embodiment further splits this data by training sets of complementary detectors (at 14, FIG. 1). For each motionlet cluster 202 the process randomly samples a smaller set of positive samples (in one example, 5000 images), trains a complementary detector 56 (as described more fully below), applies the detector tuned to have very few or no false alarms (and all other already trained detectors in the pool) to the set of positive images of the motionlet cluster 202, and selects those that are misclassified for training another complementary detector. In this fashion, the process eliminate many redundant samples that are explained by previous detectors. This process is repeated until (at 16, FIG. 1) all the images in the cluster have been correctly classified by the current set of complementary detectors. In the present embodiment, a deep cascade detector is trained using a relatively small set of positive examples (for example, a few thousands) and a large number of selected negative samples (for example, hundreds of thousands) to reduce false alarms.

In one example, 12 motionlet clusters 202 are used, and two complementary detectors 56 per cluster 202, for a total of 24 cascade detectors 56. Other embodiment may use more, for example using a pool 54 containing hundreds of detectors 56. It is noted that each detector 56 is trained on a small subset of positive images of the training set, representing a particular sub-manifold of object appearance. Therefore, the detectors 56 are compact, requiring fewer features for discrimination.

In one example, a cascade of Adaboost classifiers is used, wherein the weak learners are simple thresholds over Haar-like features, and each complementary detector stage of the cascade is tuned to minimize false negatives at the expense of a larger number of false positives. This allows for fast inferences by quickly discarding background image patches. Boot strapping may be employed by selecting negatives examples where the previous stages have failed, and an AdaBoost learning process used to boost the classification performance perceptrons (simple learning algorithms for supervised classification of an input into one of two possible outputs) by combining a collection of weak classification functions to form a stronger classifier and returning a perceptron with a lowest classification error.

Figure 6:
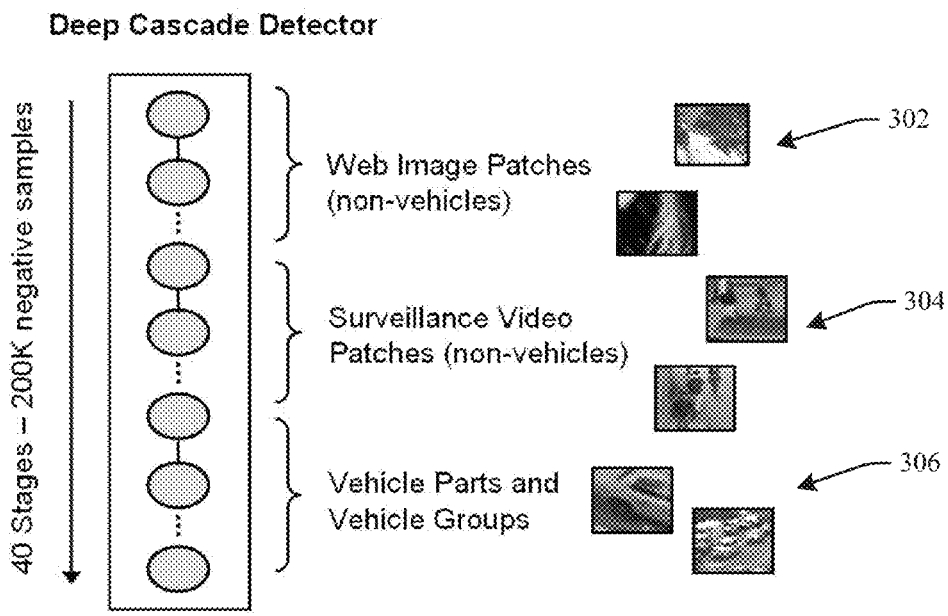
FIG. 6 is a graphic illustration of a cascade complementary detector process according to the present invention.

A large number of bootstrap rounds, for example involving hundreds of thousands of selected negative samples, may significantly improve performance. In one example, each stage of a deep cascade detector is trained with 5000 positive samples and 5000 negative samples, where the negative samples are image patches misclassified by the previous stages. One created cascade detector contains 40 stages, for a total of 200,000 selected negative examples. According to one example illustrated in FIG. 6, negative samples are initially selected from non-vehicle web image patches 302. Subsequently, negative samples 304 from surveillance videos that do not include vehicles in their scene information (for example, from pedestrian areas) are collected and used. Finally, false positive images 306 related to vehicle parts or groups of vehicles are collected automatically, for example by a simple system which enables a user to collect image patches of detector firings with user-defined minimum and maximum patch sizes for specific locations of the video.

In one example, 12 motionlet clusters 202 are used, and two complementary detectors 56 per cluster 202, for a total of 24 cascade detectors 56. Other embodiments may use more, for example using a pool 54 containing hundreds of detectors 56. It is noted that each detector 56 is trained on a small subset of positive images of the training set, representing a particular sub-manifold of object appearance. Therefore, the detectors 56 are compact, requiring fewer features for discrimination.

Using a large training dataset composed of around one million images, one embodiment of the present invention is able to run input images having a 320-by-240 pixel resolution at an average rate of 125 frames per second on a 2.3 gigahertz (GHz) computer system processing unit in communication with a memory device comprising 3 gigabytes (GB) of random access memory (RAM). Analyzing the input video data frames (at 18, FIG. 2) may comprise extracting fine-grained semantic feature attributes for each vehicle detected by the applied detectors. The extracted fine-grained feature attributes may be automatically ingested as attribute metadata into a backend database system through a web-based service-oriented architecture, though other processes and data storage may be practiced. Date, time and location data may be extracted from the input data 18 with respect to detected vehicles, for example a timestamp may indicate a beginning, end or duration of detection of a vehicle, and information about a camera used to capture the image and the camera location on a map may also be stored with the extracted data, enabling a user to search for events in a particular geographic region covered by said camera at a particular date/time. Direction of travel information is implicitly provided by an associated motionlet classifier 202 that fires on the vehicle image, and in some embodiments a motion direction histogram is built for each detected and tracked vehicle over a sequence of frames, wherein one or more motion directions 206 with larger or largest number of votes are be noted or stored in a database. A dominant color may be extracted for each detected/tracked vehicle, and a set of dominant colors may be provided for selection by a user to search for vehicles, for example six (6) colors: black, white, red, green, blue, and yellow.

In some embodiments, dominant colors may be computed from extracted features by initially converting each input video frame into a bi-conic HSL (hue, saturation, and luminance) space, and then quantizing the HSL space into the set of dominant colors. Quantization may be done by computing hue angular cutoffs between the colors in a first stage and, in a second stage, relabeling pixels as either white or black depending on whether they lie outside the lightness/saturation curve above or below the horizontal mid-plane. A cumulative histogram with bins for each of the set colors in this quantized space may be built over the vehicle images belonging to a specific detected vehicle track, wherein the color corresponding to the bin which receives the majority of votes is then assigned as the dominant color.

Figure 7:
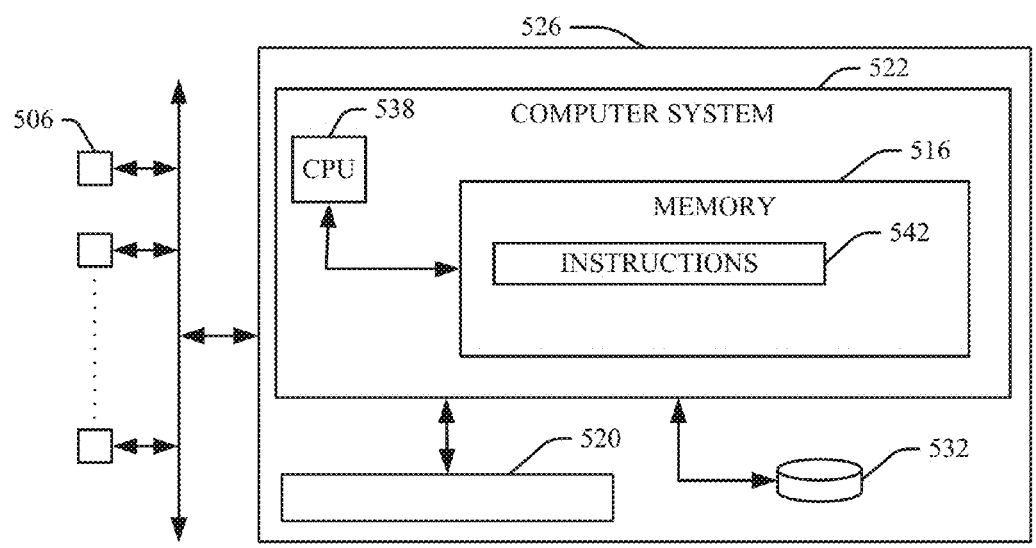
FIG. 7 is a block diagram illustration of a computer system implementation of an embodiment of the present invention.

Referring now to FIG. 7, an exemplary computerized implementation of an embodiment of the present invention includes a computer system or other programmable device 522 in communication with video data input devices 506 (cameras, hard drive, network ports, etc.) for providing video data input for automatic object retrieval from surveillance videos based on learned detectors as described above with respect to FIGS. 1-6. Instructions 542 reside within computer readable code in a computer readable memory 516, or in a computer readable storage system 532, or other tangible computer readable storage medium that is accessed through a computer network infrastructure 526 by a processing unit (CPU) 538. Thus, the instructions, when implemented by the processing unit (CPU) 538, cause the processing unit (CPU) 538 to perform interactive analysis of data objects within a display.

Embodiments of the present invention may also perform process steps of the invention on a subscription, advertising, and/or fee basis. That is, a service provider could offer to integrate computer-readable program code into the computer system 522 to enable the computer system 522 to perform automatic object retrieval from surveillance videos based on learned detectors as described above. The service provider can create, maintain, and support, etc., a computer infrastructure such as the computer system 522, network environment 526, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computer device 522, from a tangible computer-readable medium device 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatic object retrieval from input video based on learned detectors, the method comprising:
   in response to a video stream input received from a fixed-camera surveillance video for analysis, a processing unit iteratively running different detectors of a plurality of pairs of complementary detectors in one each of subsequent frames of the surveillance video stream input;
   collecting firings data for each of the run detectors per image frame location, until a threshold number of firings is reached by at least one of the run detectors; and
   analyzing the frames from the surveillance video stream input to extract image attributes of vehicle objects by applying a subset of the run detectors that each reach the threshold number of firings in collecting the firings data for the image frame locations; and
   wherein the detectors fire if an underlying vehicle image patch extracted from the motion blobs in a field of view of scene image data corresponds to image patches of the applied detectors.

2. The method of claim 1, further comprising:
   creating the plurality of pairs of complementary detectors for each of a plurality of different motionlet clusters that are partitioned from a plurality of training dataset vehicle images as a function of determining that vehicles within each of scenes of the images in each cluster share similar two-dimensional motion direction attributes within their scene, by:
   training a first detector of each of the pairs of the complementary detectors on motion blobs of vehicle objects detected and collected within each of the training dataset vehicle images within one of the motionlet clusters via a background modeling process;
   training a second detector of each pair of the complementary detectors on each of the training dataset vehicle images within the one motionlet cluster that have motion blobs of the vehicle objects but are misclassified by the first detector of each said pair of the complementary detectors; and
   repeating the steps of training the first detector and the second detector until all of the training dataset vehicle images within the one motionlet cluster for each said pair of the complementary detectors have been eliminated as false positives or correctly classified by the first detector or the second detector.

3. The method of claim 2, further comprising:
   defining a detector map comprising convex envelope regions of locations of the firings that are collected within the surveillance video stream input frames by the subset of the complementary detectors that reach the threshold in collecting the firings data; and
   analyzing the surveillance video stream input frames by limiting the applying of the subset complementary detectors to the detector map convex envelope regions.

4. The method of claim 3, further comprising:
   automatically partitioning the training dataset images into the plurality of different motionlet clusters by:
   obtaining the two-dimensional motion direction attributes of the vehicle objects within the images through an optical flow process; and
   splitting the training set images into the plurality of motionlets as a function of similarity of their associated obtaining motion direction attributes.

5. The method of claim 4, wherein the step of automatically partitioning the training dataset into the plurality of different clusters comprises:
   determining an orientation of each of the vehicles within the scenes;
   determining a direction of travel of each of the vehicles within the scenes as a function of the determined orientations; and
   assigning each of the training set images to the different clusters as a function the determined directions of travel of the vehicles sharing a similar two-dimensional motion direction attribute within their respective scenes.

6. The method of claim 4, wherein the steps of training the first detector and second detectors further comprise, until all images in the cluster have been correctly classified by the first and second detectors:
   randomly sampling a set of positive samples for the motionlet cluster;
   tuning the first detector to have a maximum threshold of false alarms on the randomly sampled set of positive samples;
   selecting training set images that are misclassified by the first detector to train the second detector; and
   eliminating redundant ones of the set of positive samples that are explained by the first and second detectors.

7. The method of claim 4, further comprising:
   integrating computer-readable program code into a computer system comprising the processing unit, a computer readable memory and a computer readable storage medium, wherein the computer readable program code is embodied on the computer readable tangible storage medium and comprises instructions for execution by the processing unit via the computer readable memory that cause the processing unit to perform the steps of iteratively running the different detectors of the plurality of pairs of complementary detectors in one each of subsequent frames of the surveillance video stream input, collecting the firings data for each of the run detectors per image frame location until a threshold number of firings is reached by at least one of the run detectors, and analyzing the frames from the surveillance video stream input to extract the image attributes of vehicle objects by applying the subset of the run detectors that each reach the threshold number of firings in collecting the firings data for the image frame locations.

8. A system, comprising:
a processing unit;
a computer readable memory in circuit communication with the processing unit; and
a computer-readable storage medium in circuit communication with the processing unit;
wherein the processing unit executes program instructions stored on the computer-readable storage medium via the computer readable memory and thereby:
iteratively runs different detectors of a plurality of pairs of complementary detectors in one each of subsequent frames of a surveillance video stream input received from a fixed-camera surveillance video for analysis;
collects firings data for each of the run detectors per image frame location until a threshold number of firings is reached by at least one of the run detectors; and
analyzes the frames from the surveillance video stream input to extract image attributes of vehicle objects by applying a subset of the run detectors that each reach the threshold number of firings in collecting the firings data for the image frame locations; and
wherein the detectors fire if an underlying vehicle image patch extracted from the motion blobs in a field of view of scene image data corresponds to image patches of the applied detectors.

9. The system of claim 8, wherein the processing unit executes the program instructions stored on the computer-readable storage medium via the computer readable memory and thereby further:
creates the plurality of pairs of complementary detectors for each of a plurality of different motionlet clusters that are partitioned from a plurality of training dataset vehicle images as a function of determining that vehicles within each of scenes of the images in each cluster share similar two-dimensional motion direction attributes within their scene, by:
training a first detector of each of the pairs of the complementary detectors on motion blobs of vehicle objects detected and collected within each of the training dataset vehicle images within one of the motionlet clusters via a background modeling process;
training a second detector of each pair of the complementary detectors on each of the training dataset vehicle images within the one motionlet cluster that have motion blobs of the vehicle objects but are misclassified by the first detector of each said pair of the complementary detectors; and
repeating the steps of training the first detector and the second detector until all of the training dataset vehicle images within the one motionlet cluster for each said pair of the complementary detectors have been eliminated as false positives or correctly classified by the first detector or the second detector.

10. The system of claim 9, wherein the processing unit executes the program instructions stored on the computer-readable storage medium via the computer readable memory and thereby further:
defines a detector map comprising convex envelope regions of locations of the firings that are collected within the surveillance video stream input frames by the subset complementary detectors that reach the threshold in collecting the firings data; and
analyzes the surveillance video stream input frames by limiting the applying of the subset complementary detectors to the detector map convex envelope regions.

11. The system of claim 10, wherein the processing unit executes the program instructions stored on the computer-readable storage medium via the computer readable memory and thereby further:
automatically partitions the training dataset images into the plurality of different motionlet clusters by:
obtaining the two-dimensional motion direction attributes of the vehicle objects within the images through an optical flow process; and
splitting the training set images into the plurality of motionlets as a function of similarity of their associated obtaining motion direction attributes.

12. The system of claim 11, wherein the processing unit executes the program instructions stored on the computer-readable storage medium via the computer readable memory and thereby further automatically partitions the training dataset into the plurality of different clusters by:
determining an orientation of each of the vehicles within the scenes;
determining a direction of travel of each of the vehicles within the scenes as a function of the determined orientations; and
assigning each of the training set images to the different clusters as a function the determined directions of travel of the vehicles sharing a similar two-dimensional motion direction attribute within their respective scenes.

13. The system of claim 11, wherein the processing unit executes the program instructions stored on the computer-readable storage medium via the computer readable memory and thereby further trains the first detector and the second detector by, until all images in the cluster have been correctly classified by the first and second detectors:
randomly sampling a set of positive samples for the motionlet cluster;
tuning the first detector to have a maximum threshold of false alarms on the randomly sampled set of positive samples;
selecting training set images that are misclassified by the first detector to train the second detector; and
eliminating redundant ones of the set of positive samples that are explained by the first and second detectors.

14. The system of claim 11, wherein the input training dataset vehicle images have a 320-by-240 pixel resolution system, the computer readable memory comprises three gigabytes of random access memory, the system is a 2.3 gigahertz system, and the processing unit executes the program instructions stored on the computer-readable storage medium via the computer readable memory and thereby trains the first and the second detectors at an average rate of 125 frames per second.

15. A computer program product, comprising:
a computer readable hardware storage device having computer readable program code embodied therewith, the computer readable program code comprising instructions for execution by a computer processing unit that cause the computer processing unit to:
iteratively run different detectors of a plurality of pairs of complementary detectors in one each of subsequent frames of a surveillance video stream input received from a fixed-camera surveillance video for analysis;

collect firings data for each of the run detectors per image frame location until a threshold number of firings is reached by at least one of the run detectors; and analyze the frames from the surveillance video stream input to extract image attributes of vehicle objects by applying a subset of the run detectors that each reach the threshold number of firings in collecting the firings data for the image frame locations; and wherein the detectors fire if an underlying vehicle image patch extracted from the motion blobs in a field of view of scene image data corresponds to image patches of the applied detectors.

16. The computer program product of claim 15, wherein the computer readable program code instructions for execution by the computer processing unit further cause the computer processing unit to:

create the plurality of pairs of complementary detectors for each of a plurality of different motionlet clusters that are partitioned from a plurality of training dataset vehicle images as a function of determining that vehicles within each of scenes of the images in each cluster share similar two-dimensional motion direction attributes within their scene, by:

training a first detector of each of the pairs of the complementary detectors on motion blobs of vehicle objects detected and collected within each of the training dataset vehicle images within one of the motionlet clusters via a background modeling process;

training a second detector of each pair of the complementary detectors on each of the training dataset vehicle images within the one motionlet cluster that have motion blobs of the vehicle objects but are misclassified by the first detector of each said pair of the complementary detectors; and repeating the steps of training the first detector and the second detector until all of the training dataset vehicle images within the one motionlet cluster for each said pair of the complementary detectors have been eliminated as false positives or correctly classified by the first detector or the second detector.

17. The computer program product of claim 16, wherein the computer readable program code instructions for execution by the computer processing unit further cause the computer processing unit to:

define a detector map comprising convex envelope regions of locations of the firings that are collected within the surveillance video stream input frames by the subset complementary detectors that reach the threshold in collecting the firings data; and analyze the surveillance video stream input frames by limiting the applying of the subset complementary detectors to the detector map convex envelope regions.

18. The computer program product of claim 17, wherein the computer readable program code instructions for execution by the computer processing unit further cause the computer processing unit to:

automatically partition the training dataset images into the plurality of different motionlet clusters by:

obtaining the two-dimensional motion direction attributes of the vehicle objects within the images through an optical flow process; and splitting the training set images into the plurality of motionlets as a function of similarity of their associated obtaining motion direction attributes.

19. The computer program product of claim 18, wherein the computer readable program code instructions for execution by the computer processing unit further cause the computer processing unit to automatically partition the training dataset into the plurality of different clusters by:

determining an orientation of each of the vehicles within the scenes;

determining a direction of travel of each of the vehicles within the scenes as a function of the determined orientations; and assigning each of the training set images to the different clusters as a function the determined directions of travel of the vehicles sharing a similar two-dimensional motion direction attribute within their respective scenes.

20. The computer program product of claim 18, wherein the computer readable program code instructions for execution by the computer processing unit further cause the computer processing unit to train the first detector and the second detector by, until all images in the cluster have been correctly classified by the first and second detectors:

randomly sampling a set of positive samples for the motionlet cluster;

tuning the first detector to have a maximum threshold of false alarms on the randomly sampled set of positive samples;

selecting training set images that are misclassified by the first detector to train the second detector; and eliminating redundant ones of the set of positive samples that are explained by the first and second detectors.

* * * * *